United States Patent

[11] 3,585,845

| [72] | Inventors | Richard C. Cornell;<br>Robert Gittins, both c/o Analytical Instruments Ltd., Fowlmere, Royston, Hertfordshire, England |
|---|---|---|
| [21] | Appl. No. | 773,067 |
| [22] | Filed | Nov. 4, 1968 |
| [45] | Patented | June 22, 1971 |
| [32] | Priority | Nov. 9, 1967 |
| [33] | | Great Britain |
| [31] | | 51147/67 |

[54] GAS LEAK DETECTORS
4 Claims, 4 Drawing Figs.

| [52] | U.S. Cl. | 73/40.7 |
|---|---|---|
| [51] | Int. Cl. | G01m 3/20 |
| [50] | Field of Search | 73/40.7; 250/83.6 FT |

[56] References Cited
UNITED STATES PATENTS

| 2,833,151 | 5/1958 | Harvey | 73/422 |
|---|---|---|---|
| 2,996,661 | 8/1961 | Roberts | 73/40.7 X |
| 3,247,375 | 4/1966 | Lovelock | 250/43.5 |
| 3,361,908 | 1/1968 | Petitjean et al. | 250/43.5 |
| 3,444,721 | 5/1969 | Hearn et al. | 73/40.7 |

*Primary Examiner*—S. Clement Swisher
*Attorneys*—Emory L. Groff and Emory L. Groff, Jr.

ABSTRACT: A gas-leak detector, responsive to a halogen-containing tracer gas which is introduced into a vessel to be tested for a leak, comprising a probe through which air in the vicinity of a suspected leak may be drawn and diluted with an inert gas before being passed through an electron capture detector cell, the electric current through the cell serving to detect the presence of the tracer gas.

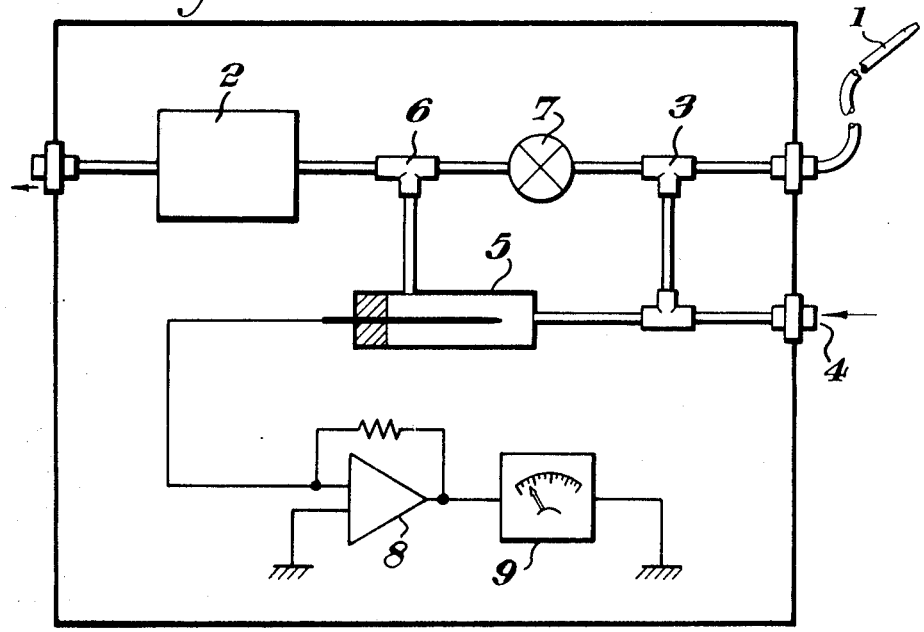
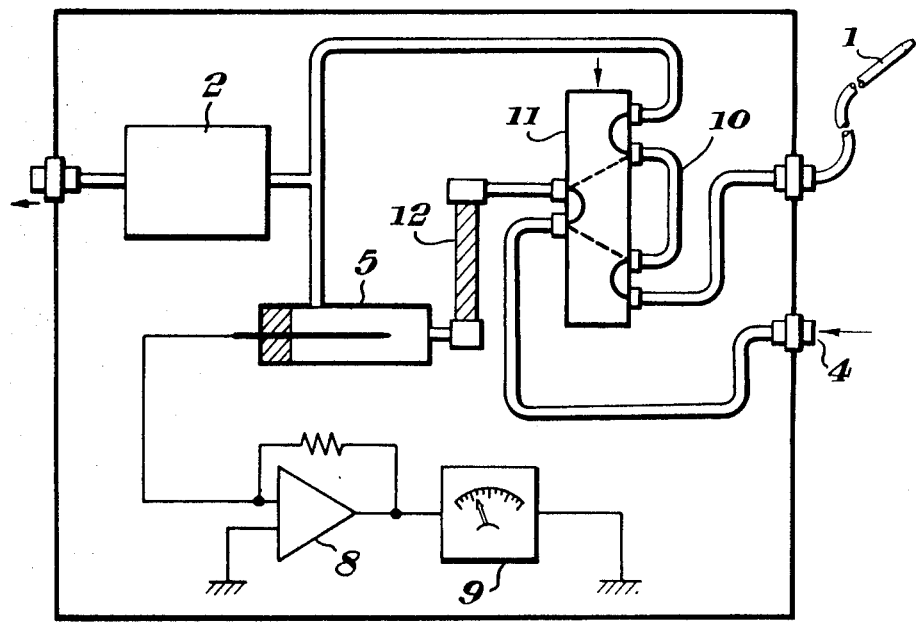

GAS LEAK DETECTORS

BACKGROUND OF THE INVENTION

This invention relates to a gas-leak detector, that is a device which may be used for detecting the presence of a leak in a vessel or the like containing a gas, by sampling the atmosphere around the vessel with detector means responsive to the or a gas contained in the vessel.

Hitherto, high-sensitivity gas-leak detection has been performed by instruments such as the mass spectrometer and the infrared leak detector. Both of these instruments detect small concentrations of a tracer gas, in air or other inert gas, which finds its way into the instrument via a leak in a test vessel. Both of these instruments are bulky and expensive, and have insufficient sensitivity for a number of applications.

There are many leak detectors of lower sensitivity, such as the halogen leak detector, the catalytic combustion detector (for hydrocarbon leaks), and the thermal conductivity leak detector. These may only be used to detect large gas leaks.

An object of this invention is to provide a gas-leak detector which will be responsive to a tracer gas introduced into a test vessel or the like, the detector being extremely sensitive to the tracer gas and sensitive to as few other gases as possible.

Another object is to provide a gas-leak detector which is portable, inexpensive and of high sensitivity.

SUMMARY OF THE INVENTION

According to this invention there is provided a gas-leak detector including an electron capture detector cell, means for passing gas drawn in through a probe through the cell and an indicating or sensing device responsive to current flow through the electron capture detector cell. The tracer gas, introduced into the gas to be detected, is one to which the electron capture detector is especially responsive, such as a halogen or more particularly sulfur hexafluoride.

The sample may be drawn in continuously through the probe and the electrical output from the electron capture detector amplified and indicated on a meter. The detector is, however, also responsive to oxygen, and when using the device for sampling in an oxygen containing atmosphere, it is necessary to dilute a portion of the sampled gas with a purge or inert gas, that is a gas to which the cell is not responsive, for example nitrogen; this is to ensure that the proportion of oxygen entering the cell is insufficient to cause saturation. In such a case the meter reading will increase when the tracer gas is present as, in the case of sulfur hexafluoride, the response of the cell is 100,000 times as great as compared with oxygen.

In an alternative method of introducing the purge gas, the inlet to the probe comprises a capillary through which the gas to be sampled is drawn. The characteristic of this modified form of the invention is that only a small amount of sample gas is drawn in and all of this sample, as opposed to a portion, is passed to the detector cell. In order, however, to ensure a fast response time, that is to ensure that the sample drawn in through the probe reaches the detector cell quickly, nitrogen is fed in close to the capillary opening. This ensures that the sample is carried along to the detector cell in the shortest possible time.

The detector may also be used to determine the absolute concentration of tracer gas by a method in which the cell is normally supplied with an auxiliary gas such as nitrogen, which causes no response. A small sample of gas drawn in through the probe is then passed into the cell through a separating column, for example a chromatographic column; the meter reading after a predetermined time interval will then indicate the absolute concentration of the tracer gas.

In an alternative embodiment of the invention the electron capture detector may be replaced by an argon ionization detector which in general is responsive to compounds of an organic nature, such as petroleum vapors.

The electron capture detector used consists essentially of a hollow cylinder in which a source of $\beta$-rays is placed, these producing electrons by collision with nitrogen molecules. The electrons produced are collected by an axial electrode and a small potential between the axial electrode and cylinder causes a current to flow across the cell by virtue of the free electrons in the gas. When an electron capturing gas enters the cell the number of free electrons is reduced and the current falls. This fall in current is amplified and shown on a meter.

BRIEF DESCRIPTION OF THE DRAWINGS

The accompanying drawings show, by way of example, several embodiments of the invention.

In the drawings:

FIG. 1 shows an apparatus for continuous sampling,

FIG. 2 shows an apparatus for determining the absolute concentration of tracer gas.

DESCRIPTION OF PREFERRED EMBODIMENTS

Figure 3:
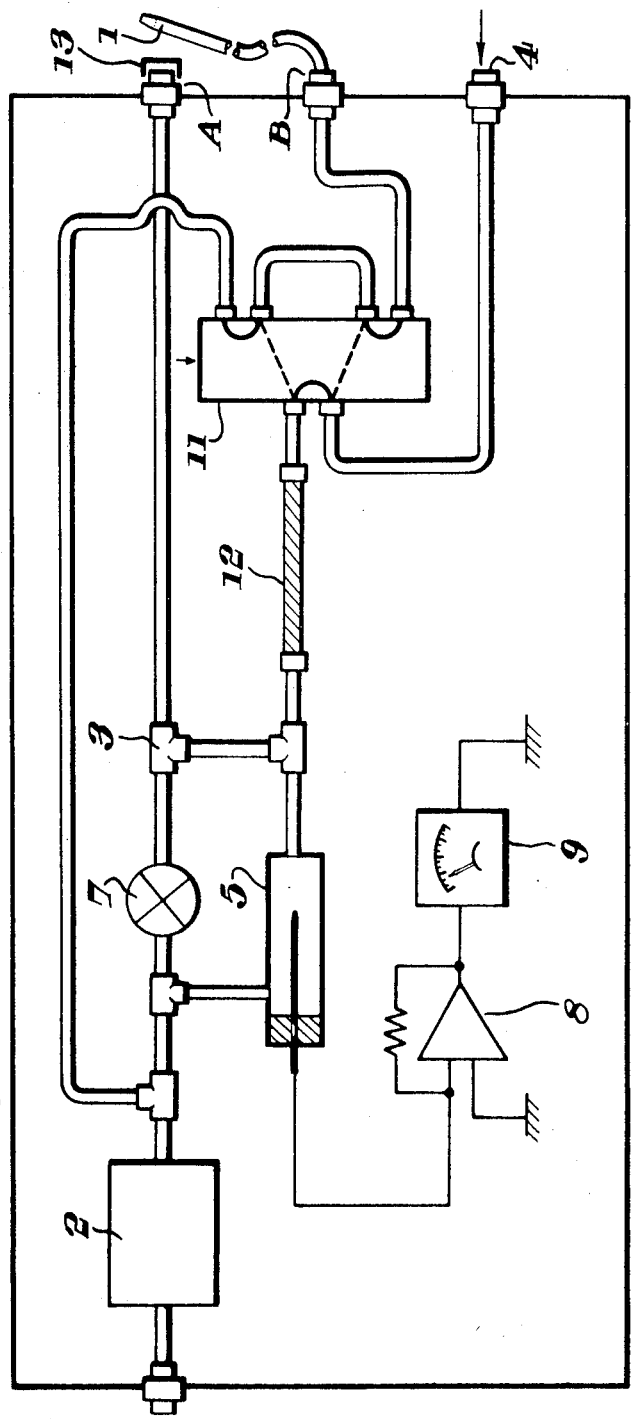
FIG. 3 shows an apparatus combining the features shown in FIGS. 1 and 2.

As shown in FIG. 1, gas to be sampled is fed or drawn into the apparatus through a probe 1 by any convenient means, a small suction pump 2 being used in this case. A small proportion of the gas is diverted from the main stream through a T-piece 3 and is diluted by a flow of purge gas, that is a nonelectron capturing gas such as nitrogen, introduced at 4. The diluted sampled gas is then fed into an electron capture detector 5 where any halogenated material is detected. The sample dilution is necessary when sampling from any oxygen containing gas, since this gas in large quantities will saturate the detector.

The gas leaving the detector may be led to a vent, but is more conveniently fed back into the main sample flow via a T-piece 6. Adjustment of the intake of gas to be sampled, into the detector, is necessary when oxygen or halogenated gases are present in large quantities in order that the detector shall not be saturated. This adjustment may be provided by any means, but one convenient method is by means of a needle valve 7 connected into the sample flow line in parallel with the detector. The purge gas flow rate is small compared with the sample flow and thus the setting of the needle valve 7 will determine the pressure drop across the detector and hence the flow rate of sample gas through the detector. At the same time this arrangement of the gas flow circuit will enable a high sample flow to be maintained, thus producing a short response time, that is the time taken for a halogenated gas sample to reach the detector from first entering the probe. A short response time is essential when searching for leaks around a pressurized vessel.

The electrical output from the detector is fed into an amplifier 8, which may be solid state, the output from which may be presented in some convenient form such as on a meter 9 as shown, or a chart recorder, or alternatively converted into an audible or visible alarm.

In the apparatus of FIG. 1 only a change of concentration of halogenated material or oxygen can be detected. In the apparatus shown in FIG. 2, the absolute concentration of halogenated gas (test gas) in the sample can be measured. The sampled gas is drawn or fed into the instrument through a probe, as previously described in FIG. 1. The sampled gas is fed through a loop 10 of a gas sampling valve 11 and may be conveniently fed to waste through the pump 2. An auxiliary gas which exhibits no electron capturing property, such as nitrogen, is fed through another part of the gas sampling valve and into a chromatographic separating column 12 which is typically a short tube packed with alumina powder. The gas emerging from the column is then fed to the electron capture detector 5. Normally only the auxiliary gas passes through the detector and none of the sample is allowed to pass through the column to the detector. However, when the sampling valve is actuated, the sample gas in the loop 10 is flushed into the column and is separated into components as it passes down the column. The test gas is recognized by the time it takes to emerge from the column into the detector.

The electrical output from the detector may be treated in the same way as in FIG. 1; that is the signal is amplified and the output may be presented in any convenient form, on a meter, recorder, or as an audible or visible alarm.

The gas circuitry may be arranged in an apparatus so that both modes of operation are possible in the one apparatus. One such system is shown in FIG. 3, and has been designed so that it is simple to change from one mode of operation to the other. The combination circuit shown in FIG. 3 is self-explanatory after referring to FIGS. 1 and 2. In the continuous sampling mode, the probe 1 is connected to inlet A while inlet B is closed, and in the intermittent sampling mode, to determine the absolute concentration, the probe is connected to inlet B and inlet A is closed by a cap 13 as shown.

Figure 4:
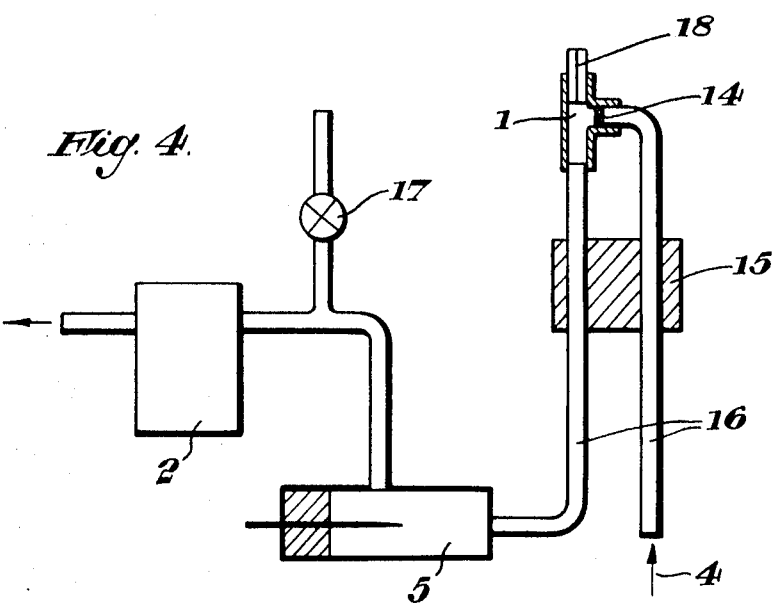
FIG. 4 shows the alternative method of introducing the purge gas.

FIG. 4 shows, in simplified form, a modified method of introducing the purge gas. In this arrangement the probe inlet 18 is a capillary tube and the sample drawn in by the pump 2 is all passed to the detector cell 5. Close to the capillary at 1 is the nitrogen inlet tube which has a restriction 14 which produces a slight pressure drop at the point 1, so that a small quantity of sample is drawn in through the capillary 18. In this arrangement, although only a small quantity of gas is drawn in a fast response time is achieved by means of the fast nitrogen flow 4. A valve 17 regulates the suction produced by the pump 2. The probe and nitrogen lines may conveniently be contained in a handle 15 connected to the instrument by flexible lines 16. It is also possible for the detector cell to be located close to the capillary inlet 18, and to be connected to the instrument by leads. In this modified arrangement the dilution resulting from a large intake of gas to be sampled is overcome and the device is more sensitive to small leaks.

The apparatus shown in FIGS. 1, 2, 3 and 4 will detect the presence of any halogenated gas, since every one of this class of compounds exhibits an electron capturing property to a greater or lesser degree. These gases may be introduced in very low concentrations into pressurized or evacuated vessels, and leaks from such vessels can then be easily detected by any one of the devices described. It has been found that the apparatus using the electron capture detector is especially sensitive to sulfur hexafluoride, which exhibits a response many times that of any other gas.

We claim:

1. Method of detecting leaks in vessels using an electron capture detector cell which comprises introducing a halogen-containing tracer gas into a vessel, drawing in a sample of atmosphere in the vicinity of a suspected leak through a probe, diluting the sample with a gas to which the cell is not responsive such that the atmospheric oxygen content present in the sample gas does not saturate the cell, passing the diluted sample through the detector and measuring the current through the detector.

2. A gas-leak detector comprising an electron capture detector cell, a probe, suction means for drawing a gas sample from the atmosphere through the probe into the cell, a purge gas supply for diluting said gas sample prior to entry into the cell to prevent saturation of the cell with atmospheric oxygen and means for detecting a change in current through the cell produced by the gas sample.

3. Method as claimed in claim 1 wherein the halogen containing gas is sulfur hexaflouride.

4. A gas-leak detector as claimed in claim 2, wherein the probe comprises a capillary inlet through which the sample is drawn in, the purge gas being introduced downstream of the capillary through a restriction.